United States Patent [19]

Une

[11] Patent Number: 4,932,582
[45] Date of Patent: Jun. 12, 1990

[54] METHOD FOR THE PREPARATION OF A BONDING TOOL

[75] Inventor: Kouji Une, Kawasaki, Japan

[73] Assignee: Asahi Diamond Industrial Co., Ltd., Tokyo, Japan

[21] Appl. No.: 349,578

[22] Filed: May 9, 1989

[30] Foreign Application Priority Data

Jun. 24, 1988 [JP] Japan .................... 63-156062

[51] Int. Cl.$^5$ .................... B23K 35/368; B23K 35/28
[52] U.S. Cl. .................... 228/122; 228/248; 228/4.5
[58] Field of Search .......... 228/122, 124, 248, 263.12, 228/263.19, 44.7, 193, 4.5

[56] References Cited

U.S. PATENT DOCUMENTS

| | | | |
|---|---|---|---|
| 3,856,480 | 12/1974 | Johnson et al. | 228/122 |
| 3,900,153 | 8/1975 | Beerwerth et al. | 228/248 |
| 4,689,276 | 8/1987 | Jacquez | 228/193 |
| 4,821,819 | 4/1989 | Whysona | 228/122 |

FOREIGN PATENT DOCUMENTS

| | | | |
|---|---|---|---|
| 37-3116 | 11/1962 | Japan . | |
| 133512 | 11/1978 | Japan | 228/122 |
| 650759 | 3/1979 | U.S.S.R. | 228/122 |

*Primary Examiner*—Nicholas P. Godici
*Assistant Examiner*—Samuel M. Heinrich
*Attorney, Agent, or Firm*—Frishauf, Holtz, Goodman & Woodward

[57] ABSTRACT

A bonding tool to be employed for preparing semiconductor parts, e.g., IC, comprizing a tool-head made of a super hard material, e.g., a single crystal of diamond, etc., which comes into contact with a workpiece in the use of the bonding tool and a shank to which the tool-head is bonded by brazing with a brazing material is prepared by using a silver solder based brazing composition obtained by adding a fine powder for shrinkage-stress-relieving material, e.g., fine diamond powder, etc., to a conventional silver solder based brazing material to which titanium has been added as the brazing material. The method is advantageous in that bonding tools having improved properties; i.e., high brazing strength, high stability in practical use, low brazing strain, low thermal stress etc., can be prepared in a good yield with preventing a crack in the super hard material used as a tool-head of the bonding tools.

28 Claims, 2 Drawing Sheets

PRIOR ART

METHOD FOR THE PREPARATION OF A BONDING TOOL

BACKGROUND OF THE INVENTION

The present invention relates to a method for the preparation of a bonding tool to be employed for preparing semiconductor devices or their parts.

More particularly, the present invention relates to a method for the preparation of a bonding tool which can be employed for bonding lead wires to workpieces for semiconductor devices, including an integrated circuit (IC) and the like, by the use of tape automated bonding (TAB), the bonding tool comprizing a body of a super hard material as a tool-head which is to be in contact with a workpiece under machining by using the bonding tool and a shank to which the tool-head made of the super hard material is bonded by brazing with a specified brazing composition, the bonding tool having advantageous characters; i.e., those including that a brazing strain is so small that the tool-head made of the super hard material rarely cracks, and that the bond strength between the shank and the tool-head made of the super hard material is extremely high.

Bonding tools for tapeautomated bonding (TAB) are tools to be employed for bonding, at a time by thermocompression, an array of lead wires integrated onto a tape carrier to a workpiece for a semiconductor part, such as IC, etc.. The bondings of the workpiece by the use of a bonding tool are usually conducted under severe conditions; i.e., at such high temperatures as those of 500° C. to 600° C. and under repeating high loading conditions, the workpiece being in contact with the tool-head of the bonding tool. Therefore, a material having a high heat resistance, a high abrasion resistance, a high heat conductivity, and an adhesion-resisting property against a brazing material, especially a single crystal of diamond, has preferably been used as a material for a tool-head of a bonding tool.

Several attempts and proposals have been made to prepare a bonding tool for TAB by using a single crystal of daimond as a material for the tool-head of the bonding tool. These known methods include:

(A) a method for preparing a bonding tool whose typical structure is schematically illustrated in FIG. 2, comprising the step of mounting a single crystal of diamond to be used as a tool-head 1 to a shank 6 through a sintered body of metal powder 5 wherein the tool-head 1 is supported, usually only mechanically by the shrinkage forces of the sintered body of metal powder 5, in the hole of the sintered body of metal powder 5; and (B) a method for preparing a bonding tool whose typical structure is schematically illustrated in FIG. 3, comprizing the step of bonding by brazing a single crystal of diamond to be used as a tool-head 1 to a shank 4 made of tungsten or molybdenum having a low thermal expansion coefficient with a conventional brazing material 2, such as a titanium-containing silver solder, a tantalum-containing gold solder, etc.

In the place of the single crystal of diamond, other kinds of super hard materials, including diamond compacts, CBN compacts, cemented carbides, molybdenum, and the like, have also been used as a material for the tool-head of a bonding tool in the prior art methods.

However, those known for the preparation of a bonding tool for TAB have a variety of disadvantages and are not always satisfactory.

For example, one of the serious disadvantages of the method (A) wherein the tool-head 1 made of a single crystal of diamond is only mechanically supported is that this method requires a larger diamond grit compared to other methods in the preparation of a bonding tool and another serious disadvantage of this method is that the bonding tools prepared thereby have serious problems; i.e., those including that the tool-head 1 made of a single crystal öf diamond sometimes slips or shakes in the hole of the sintered body of metal powder 5 and tends to come off therefrom under machining in the use of the thus prepared bonding tools. It is possible to support strongly the tool-head 1 made of a single crystal of diamond with the sintered body of metal powder 5 by reacting them with each other at their interface at high temperatures even when the method (A) is employed; however, in this case, there will be other serious problems, such that the occurrence on a crack in the single crystal of diamond cannot be avoided and so on.

On the other hand, the method (B) in which a single crystal of diamond is bonded by brazing in vacuum to a shank made of tungsten or molybdenum having a low thermal expansion coefficient by the use of a conventional titanium-containing silver solder as a brazing material, has such a disadvantage in that a large distortion or cracking of the tool-head made of a single crystal of diamond is caused by the combination of shrinkage stress induced by solidification of the brazing material used and stress based on the thermal expansion or shrinkage of the shank in the thus prepared bonding tools, although the brazing strengh may be improved by the action of the titanium which is added.

If a conventional tantalum-containing gold solder is used in the place of the titanium-containing silver solder in the method described above, the distortion of the tool-head made of a single crystal of diamond may be small and the occurrence of a crack in the single crystal of diamond may be suppressed; however, this method also has problems, including that the tool-head made of a single crystal of diamond tends to come off from the shank because the brazing strength of a tantalum-containing gold-solder is much lower than that of a titanium-containing silver solder and is not high enough for practical use.

SUMMARY OF THE INVENTION

The present invention accordingly has a object to provide an improved method for the preparation of a bonding tool to be employed for preparing semiconductor devices or their parts, especially for preparing them by the use of a tape automated bonding (TAB), the bonding tool comprising a body of a super hard material as a tool-head which is to be in contact with a workpiece under bonding by using the bonding tool and a shank to which the tool-head made of the super hard material is bonded by brazing with a silver solder based brazing composition. The method has advantages in that the bonding tool prepared by the method has high stability in for performance as a bonding tool of this type, and that the bonding tool can be prepared by the method in a good yield without the occurrence of a crack in the body of the super hard material used as the tool-head and without the above described disadvantages and problems of the prior art methods. The tool-head made of the super hard material is strongly and stably bonded by brazing to the shank.

As the result of our researches to attain the object described above, we have found that the object can be attained if a bonding tool is prepared by bonding by brazing a body of a super hard material to by used as a tool-head to a shank by the use of a silver solder based brazing composition obtained by adding a finely powdered shrinkage-stress-relieving material to a conventional silver solder based brazing material, and we eventually, on the basis of these findings, have completed the present invention.

Thus, the method of the present invention provides the preparation of a bonding tool to be employed for preparing semiconductor devices or their parts, especially for preparing them by the use of a tape automated bonding, the bonding tool comprising a body of a super hard material as a tool-head which comes into contact with a workpiece to be processed by bonding in the use of the bonding tool and a shank to which the tool-head made of the super hard material, is attached. The method comprises the step of bonding by brazing a body of a super hard material to be used as the tool-head to a shank by using a silver-solder-based brazing composition obtained by adding a finely powdered shrinkage-stress-relieving material to a silver solder based brazing material.

DETAILED DESCRIPTION OF THE PREFERRED EMBODIMENT

Figure 1:
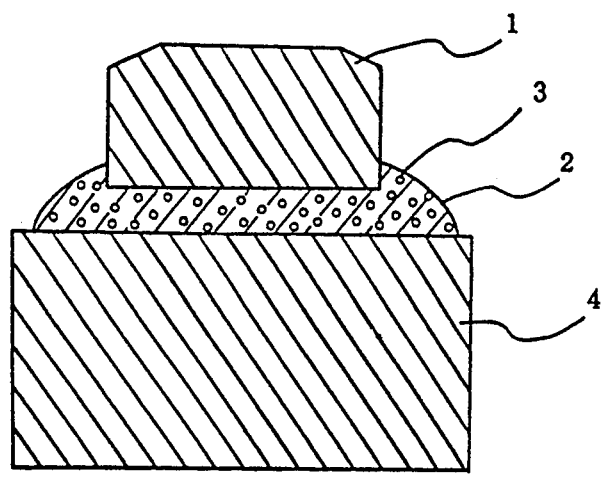
FIG. 1 schematically illustrates a cross-sectional view of an example of a bonding tool prepared by the method of the present invention.
Figure 2:
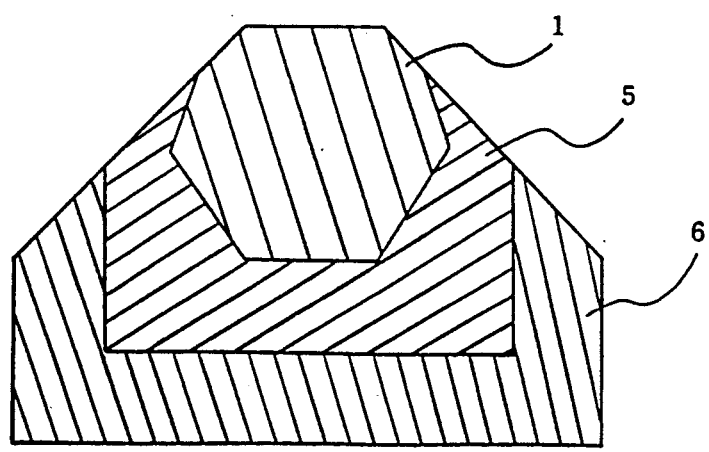
FIGS. 2 and 3 schematically illustrate cross-sectional views of different examples of bonding tools prepared by prior art methods, respectively.
Figure 3:
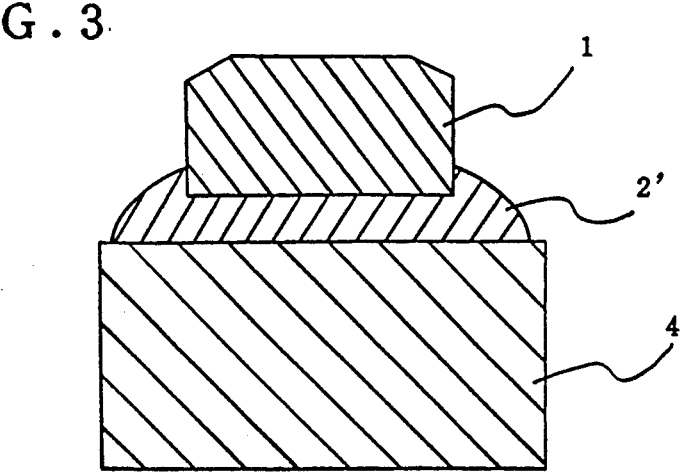

The super hard materials that can be used in the present invention as a material for the tool-head include those that have conventionally used as a material for the tool-head of a conventional bonding tool for TAB. Typical examples of the super hard materials used in the present invention can be a single crystal diamond, diamond compacts, CBN compacts, cemented carbides, molybdenum and the like, and unified bodies of mixtures thereof. Among them a single crystal of diamond may most preferably be used as the tool-head in the present invention in respect of service life in practical use as a machining tool.

Materials having a low thermal expansion coefficient can preferably be used as a material for the shank in the present invention. Typical examples of the preferred materials used as a material for the shank in the present invention include tungsten, molybdenum, and the like.

The silver solder based brazing materials used in the present invention as a brazing material for bonding by brazing a body of the super hard material to the shank are those that can be obtained by adding a fine powder for shrinkage-stress-relieving material to a silver solder based brazing material.

Typical examples of the silver-solder-based brazing materials that can be used as a base-material for the silver solder based brazing compositions used as a brazing material in the present invention include conventionally used silver solder based brazing materials, including conventional silver solders, preferably those obtained by adding a suitable amount of titanium to a silver solder whose composition is equivalent to that of a JIS BAg silver solder which contains from 71 to 73% silver, 27 to 29% copper and a total of less than 0.15% of other elements. Among them silver solder based brazing materials having a titanium content of 0.5 to 4% by weight can more preferably be used as the base-materials in obtaining the silver solder based brazing compositions used as the brazing material in the present invention.

The silver solder based brazing compositions used as a brazing material in the present invention contain a finely powdered shrinkage-stress-relieving material. The finely powdered shrinkage-stress-relieving material used as a component of the silver solder based brazing compositions can prevent both the concentration of a stress into the tool-head made of a super hard material and the occurrence of a crack therein and can suppress the brazing strain therein, acting as a buffer material against both shrinkage-stress caused by the solidification of the brazing material used and stress based on the thermal expansion or shrinkage of the shank in the bonding tool.

Typical examples of the finely powdered shrinkage-stress-relieving materials that can provide the preferable effects as described above and can be used as an additive component in obtaining the silver-solder-based brazing compositions in the present invention include finely powdered diamond, finely powdered quartz, finely powdered silicon nitride, and the like, and mixtures thereof. Among them finely powdered diamond can preferably be used as the finely powdered shrinkage-stress-relieving material in the present invention.

It is preferred that the average particle size of the finely powdered shrinkage-stress-relieving materials be less than 20 $\mu$m. If a finely powdered shrinkage-stress-relieving having an average particle size of not less than 20 $\mu$m is used, the effects of the present invention may only insufficiently be obtained. The amount of the finely powdered shrinkage-stress-relieving material added is preferably from 1 part to 10 parts by volume per 100 parts by volume of the silver solder based brazing composition. If the amount of the finely powdered shrinkage-stress-relieving material added is less than 1 part by volume, the effects of the present invention may only insufficiently be obtained. On the other hand, if it is in excess of 10 parts by volume, the brazing strength between the tool-head and the shank tends to decrease.

Various brazing procedures, including known brazing procedures that have conventionally been used in the prior art methods for the preparation of brazing-typed bonding tools for TAB can be employed as a procedure for bonding by brazing a body of the super hard material to the shank with the silver-solder-based brazing composition in the method of the present invention. Typical examples of the brazing procedures that can be employed in the method of the present invention include those in which a body of the super hard material is bonded by brazing to the shank in vacuum, usually at a pressure in the range of about $5 \times 10^{-5}$ Torr to 1 Torr, and at high temperatures, preferably at a temperature in the range of 850° C. to 1000° C., while the brazing system is heated by the use of a high-frequency heating technique, for example. The structure of an example of the thus prepared bonding tools can be seen in FIG. 1. FIG. 1 is a schematic cross-sectional view of an embodiment of a bonding tool for TAB prepared by the method the present invention, showing a structure of the bonding tool characterized in that a tool-head 1 made of a super hard material is bonded by brazing to a shank 4 having a low thermal expansion coefficient made of tungsten, molybdenum or the like with a silver solder based brazing composition 2 comprizing a finely powdered shrinkage-stress-relieving material 3 dispersed in a conventional silver-solder-based brazing material.

The bonding tools for TAB prepared by the method of the present invention have such preferable characteristics as those including that the brazing strain is so small that the tool-head made of a super hard material rarely cracks, and that the brazing strength between the tool-head and the shank is high. Among them, the bonding tools for TAB prepared by using a single crystal of diamond as a body of the super hard material used as the tool-head, by using a titanium-containing silver solder based brazing material as a silver solder based brazing material, by using finely powdered diamond as a finely powdered shrinkage-stress-relieving material, and by using a material having a low thermal expansion coefficient, such as tungsten molybdemun, etc., as a material for the shank are especially advantageous in the characteristics described above and have a long life in practical use as a machining tool. These bonding tools for TAB can preferably be used as a machining tool for bonding, at a time by mean of thermocompression, an array of lead wires integrated onto a tape carrier to a workpiece for a semiconductor device, especially to an integrated circuit.

The present invention is described in more detail by way of the following examples making reference to the accompanying drawing; however, the present invention is not restricted by the examples.

EXAMPLE 1

Silver solder based brazing compositions having different compositions were prepared by adding the respective amounts of fine diamond powder having the respective average particle sizes as shown in the single table to a silver solder based brazing material having a titanium content of 2% by weight, wherein the composition of the silver solder based brazing material used was equivalent to that of a JIS BAg-8, silver solder.

By using the respective silver-solder-based brazing compositions thus obtained as a bazing matrial, some bonding tools were prepared by bonding by brazing a single crystal of diamond to a shank made of tungsten at a pressure of $5 \times 10^{-5}$ Torr and at temperatures in the range of about 850° to 900° C., while a high-frequency heating technique being employed as a mean for heating the brazing system, wherein the single crystal of diamond used was the one having a size of its bonding surface of 5 mm × 5 mm and that had been obtained by polishing a natural diamond grit by mean of a parallel polishing technique.

The degree of a brazing strain, the presence of a crack in the single crystal of diamond brazed, and brazing strength in the bonding tools thus obtained were examined. These results are shown in the single table, wherein the values of the brazing strength shown in the table are represented by those of the rupture stress measured by loading a tensile force perpendicular to the brazed plane on the tool-head and the shank in the different directions, respectively, by using a universal testing machine.

The single table shows that a preferred average size and a preferred amount of a finely powdered diamond which is added to a silver solder based brazing material are less than 20 μm and from 1 part to 10 parts by volume per 100 parts by volume of a silver solder based brazing composition, respectively.

TABLE

| Average Size of Diamond Powder | AMOUNT OF DIAMOND POWDER ADDED (% by Volume*) | | | | | | | | |
|---|---|---|---|---|---|---|---|---|---|
| | 1> | | | 1 to 10 | | | 10< | | |
| | Brazing Strength (kg/mm²) | Degree of Strain | Presence of Crack | Brazing Strength (kg/mm²) | Degree of Strain | Presence of Crack | Brazing Strength (kg/mm²) | Degree of Strain | Presence of Crack |
| 10> | 31 | Large | YES | 30 | Small | NO | 8 | Small | NO |
| 10 to 20 | 28 | Large | YES | 29 | Small | NO | 7 | Small | NO |
| 20< | 13 | Large | NO | 11 | Small | NO | 4 | Small | NO |

*[(the volume of diamond powder added)/(the volume of silver-solder-based brazing composition obtained)] × 100

EXAMPLE 2

A fine diamond powder having particle sizes of 2 μm to 4 μm was used as a fine powder for shrinkage-stress-relieving material. A silver solder based brazing composition having a content of the fine diamond powder of 2% by volume was prepared by adding the corresponding amount of the fine diamond powder to a JIS BAg-8, silver-solder-based brazing material having a titanium content of 2% by weight. A speciman of a bonding tool was then prepared by repeating the procedure for the preparation of the bonding tool described in Example 1, except that the above prepared silver solder based brazing composition was used in the place of the brazing composition used in Example 1.

Figure 4:
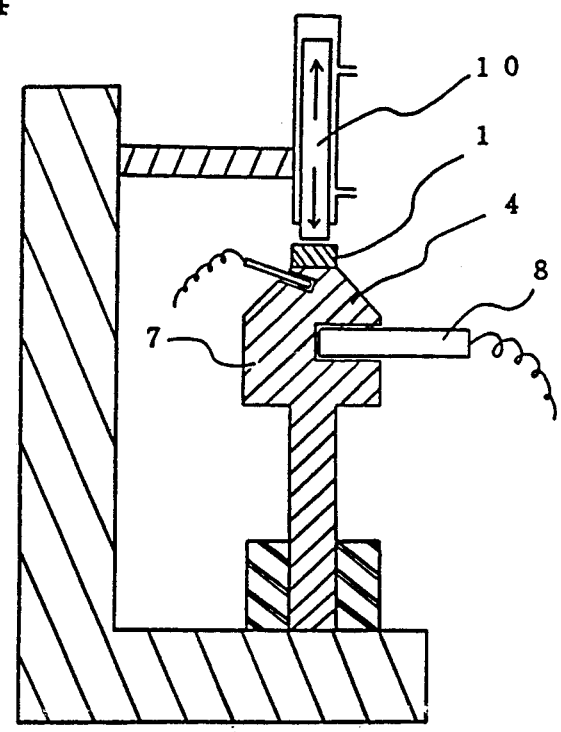
FIG. 4 illustrates a schematic view of a testing device for evaluating the performance of the bonding tools prepared and a specimen of a bonding tool prepared by the inventive method and mounted to the testing device.

The performance of the thus prepared bonding tool was examined by using a testing device shown in FIG. 4, wherein the examination was conducted by giving five hundred thousand shots, each shot having a stress of 25 kg/cm², to the bonding tool 7 by mean of a piston 10, while the temperature of the bonding tool maintaining at about 600° C. by heating with a heater 8.

Thereafter the state of the surface of the brazed portion between the tool-head made of the single crystal of diamond and the shank in the bonding tool given the shots was observed under a polarization microscope. As the result, the state of the bonding between the tool-head and the shank was still good enough without essential problems, although a very minor change caused by the shot-test in the state of the strain around the brazed portion was observed.

EXAMPLE 3

A specimen of a bonding tool was prepared by repeating the procedure of Example 2, except that a fine diamond powder having particle sizes of 16 μm to 20 μm was used in the place of the fine diamond powder used in Example 2.

The performance of the thus prepared bonding tool was examined in the same manner as described in Example 2.

Thereafter the state of the surface of the brazed portion between the tool-head made of the single crystal of diamond and the shank in the bonding tool given the shots was observed under a polarization microscope. As the result, the state of the bonding between the tool-head and the shank was still good enough without essential problems, although a very minor change by the shot-test in the state of the strain around the brazed portion was observed.

As is understood from the above given description, the present invention provides a very efficient and reliable method for the preparation of a bonding tool to be employed for preparing semiconductor devices or their parts, especially for preparing them by the use of a tape automated bonding (TAB), the bonding tool comprizing a body of a super hard material as a tool-head to be in contact with a workpiece to be processed by bonding in the use of the bonding tool and a shank to which the tool-head made of the super hard material is bonded by brazing with a silver solder based brazing composition comprizing a fine powder for shrinkage-stress-relieving material. Since the silver solder based brazing compositions obtained by adding a fine powder for shrinkage-stress-relieving material to a silver solder based brazing material are used in the present invention as a brazing material for bonding by brazing a body of a super hard material to be used as a tool-head to a shank, the preventions of both the concentration of a stress into the tool-head made of a super hard material and the occurrence of a crack in the tool-head as well as the suppression of the brazing stress in the bonding tool prepared can affectively be attained mainly by the action of the fine powder for shrinkage-stress-relieving material dispersed in the silver solder based brazing material. This is a great difference from conventional bonding tools prepared by using conventional silver solder based brazing materials such as conventional silver solder, conventional titanium-containing silver solders, etc. as a brazing material for bonding by brazing a body of a super hard material to a shank.

Moreover, the bond strength between the tool-head made of a super hard material and the shank can be further improved if a bonding tool is prepered by the use of a titanium-containing silver solder based brazing composition comprizing a fine powder for shrinkage-stress-relieving material as the brazing material in the method of the present invention.

What is claimed is:

1. A method for the preparation of a bonding tool having a tool head which contacts a workpiece when the bonding tool is used, said bonding tool comprising a single crystal diamond as a tool head bonded to a shank by a brazing material, comprising applying a titanium-containing silver solder brazing material which contains fine diamond powder which acts as a shrinkage stress relieving additive on a surface of said shank and positioning said single crystal diamond on said brazing material and heating to braze said single crystal diamond to said shank and form said bonding tool.

2. The method of claim 1, wherein said fine diamond powder has an average particle size of less than 20 μm.

3. The method of claim 1, wherein the amount of said fine diamond powder in said brazing material is from 1 part to 10 parts by volume per 100 parts by volume of said brazing material.

4. The method of claim 2, wherein the amount of said fine diamond powder in said brazing material is from 1 part to 10 parts by volume per 100 parts by volume of said brazing material.

5. The method of claim 1, wherein said brazing material contains from 0.5 to 4% by weight of titanium.

6. The method of claim 4, wherein said brazing material contains from 0.5 to 4% by weight of titanium.

7. The method of claim 1, wherein said shank comprises tungsten or molybdenum.

8. The method of claim 4, wherein said shank comprises tungsten.

9. The method of claim 5, wherein said shank comprises tungsten.

10. The method of claim 6, wherein said shank comprises tungsten.

11. A bonding tool having a tool head which contacts a workpiece when the bonding tool is used, said bonding tool comprising a single crystal diamond as a tool head bonded to a shank by a brazing material positioned between said single crystal diamond and said shank, said brazing material comprising a titanium-containing silver solder brazing material which also contains fine diamond powder which acts as a shrinkage stress relieving additive.

12. The bonding tool of claim 11, wherein said fine diamond powder has an average particle size of less than 20 μm.

13. The bonding tool of claim 11, wherein the amount of said fine diamond powder in said brazing material is from 1 part to 10 parts by volume per 100 parts by volume of said brazing material.

14. The bonding tool of claim 12, wherein the amount of said fine diamond powder in said brazing material is from 1 to 10 parts by volume per 100 parts by volume of said brazing material.

15. The bonding tool of claim 11, wherein said brazing material contains from 0.5 to 4% by weight of titanium.

16. The bonding tool of claim 14, wherein said brazing material contains from 0.5 to 4% by weight of titanium.

17. The bonding tool of claim 11, wherein said shank comprises tungsten or molybdenum.

18. The bonding tool of claim 14, wherein said shank comprises tungsten.

19. The bonding tool of claim 15, wherein said shank comprises tungsten.

20. The method of claim 16, wherein said shank comprises tungsten.

21. The method of claim 1, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

22. The method of claim 4, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

23. The method of claim 7, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

24. The method of claim 11, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

25. The method of claim 14, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

26. The method of claim 18, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

27. The method of claim 19, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

28. The method of claim 20, wherein said brazing material consists essentially of silver, copper and titanium, said silver being in an amount of 71–73% of the total of silver and copper, and said copper being in an amount of 27–29% of the total of silver and copper, and said titanium being in an amount of 2% based upon the total of the silver, copper and titanium; said percentages being by weight.

* * * * *